United States Patent
Rappl et al.

(10) Patent No.: US 10,926,677 B2
(45) Date of Patent: Feb. 23, 2021

(54) NECK FAN FOR A VEHICLE SEAT AND CONTROL METHOD THEREFOR

(71) Applicant: Gentherm GmbH, Odelzhausen (DE)

(72) Inventors: Alexander Rappl, Königsbrunn (DE); Jochen Pfaff, Eching/Dietersheim (DE); Johann Würl, Mittelstetten (DE)

(73) Assignee: GENTHERM GMBH, Odelzhausen (DE)

(*) Notice: Subject to any disclaimer, the term of this patent is extended or adjusted under 35 U.S.C. 154(b) by 117 days.

(21) Appl. No.: 15/735,810

(22) PCT Filed: Dec. 14, 2016

(86) PCT No.: PCT/DE2016/000435
§ 371 (c)(1),
(2) Date: Dec. 12, 2017

(87) PCT Pub. No.: WO2017/101896
PCT Pub. Date: Jun. 22, 2017

(65) Prior Publication Data
US 2020/0039398 A1 Feb. 6, 2020

(30) Foreign Application Priority Data

Dec. 14, 2015 (DE) .................. 10 2015 016 122.9
Aug. 17, 2016 (DE) .................. 10 2016 009 884.8

(51) Int. Cl.
*B60N 2/56* (2006.01)
*B60N 2/879* (2018.01)
*B60H 1/00* (2006.01)

(52) U.S. Cl.
CPC ....... *B60N 2/5685* (2013.01); *B60H 1/00871* (2013.01); *B60N 2/5642* (2013.01); *B60N 2/5671* (2013.01); *B60N 2/879* (2018.02)

(58) Field of Classification Search
CPC .... B60N 2/5671; B60N 2/5642; B60N 2/879; B60N 2/5685; B60N 2/5657; B60N 2/5628; B60N 2/5635; B60H 1/00871
See application file for complete search history.

(56) References Cited

U.S. PATENT DOCUMENTS

| 2,738,593 | A | 3/1956 | Fox |
| 3,101,660 | A | 8/1963 | Taylor |

(Continued)

FOREIGN PATENT DOCUMENTS

| CN | 102233836 A | 11/2011 |
| CN | 102951052 A | 3/2013 |

(Continued)

OTHER PUBLICATIONS

Potentially Related U.S. Appl. No. 13/948,543, filed Jul. 23, 2013, published as 2014/0159442 on Jun. 12, 2014, granted as U.S. Pat. No. 9,333,888 on May 10, 2016.

(Continued)

*Primary Examiner* — Jessica Yuen
(74) *Attorney, Agent, or Firm* — The Dobrusin Law Firm, P.C.

(57) ABSTRACT

The present teachings relate to a neck fan for a vehicle seat for generating a usable air flow that emerges from the neck fan toward a passenger, said neck fan being provided with at least one air conveying device for generating a usable air flow in the region of a headrest or the upper end of a seat back. It is provided that one or more compensating means are provided, by means of which asymmetrical climatic conditions caused by interfering currents in the area surrounding a passenger can be compensated for, and that one or more compensating means act asymmetrically on the usable air flow and/or impart an asymmetry to the cross-section of the usable air flow, at least in the region of an (Continued)

Figure 1:
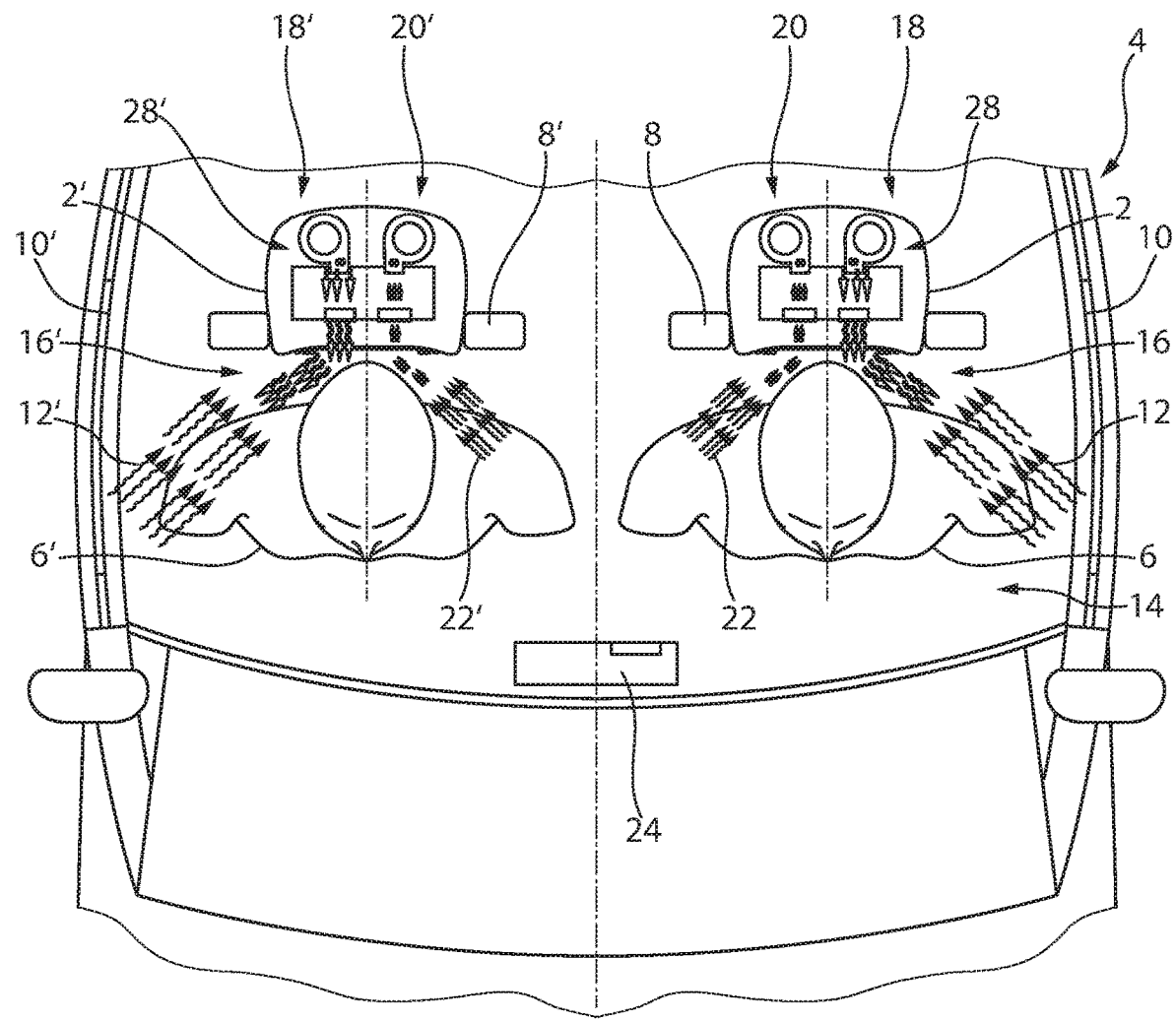

outlet of the neck fan, said asymmetry relating to at least one geometric or thermodynamic parameter.

20 Claims, 6 Drawing Sheets

(56) References Cited

U.S. PATENT DOCUMENTS

| | | | |
|---|---|---|---|
| 4,092,963 | A | 6/1978 | Vrooman |
| 5,102,189 | A | 4/1992 | Saito et al. |
| 5,160,517 | A | 11/1992 | Hicks et al. |
| 5,839,774 | A | 11/1998 | Hack et al. |
| 5,927,817 | A | 7/1999 | Ekman et al. |
| 6,059,018 | A | 5/2000 | Yoshinori et al. |
| 6,196,627 | B1 | 3/2001 | Faust et al. |
| 6,321,996 | B1 | 11/2001 | Odebrecht et al. |
| 6,604,785 | B2 | 8/2003 | Bargheer et al. |
| 6,644,735 | B2 | 11/2003 | Bargheer et al. |
| 6,761,399 | B2 | 7/2004 | Bargheer et al. |
| 7,784,863 | B2 | 8/2010 | Fallen |
| 7,963,595 | B2 | 6/2011 | Ito et al. |
| 8,143,554 | B2 | 3/2012 | Lofy |
| 8,167,368 | B2 | 5/2012 | Eckel |
| 8,201,203 | B2 | 6/2012 | Vitito |
| 8,256,236 | B2 | 9/2012 | Lofy |
| 8,434,314 | B2 | 5/2013 | Comiskey et al. |
| RE44,272 | E | 6/2013 | Bell |
| 8,505,320 | B2 | 8/2013 | Lofy |
| 8,516,842 | B2 | 8/2013 | Petrovski |
| 8,575,518 | B2 | 11/2013 | Walsh |
| 9,333,888 | B2 | 5/2016 | Helmenstein |
| 9,346,384 | B2 | 5/2016 | Zhang et al. |
| 2006/0059933 | A1 | 3/2006 | Axakov et al. |
| 2006/0273646 | A1 | 12/2006 | Comiskey |
| 2008/0036249 | A1 | 2/2008 | Heckmann et al. |
| 2009/0108654 | A1* | 4/2009 | Petzel ................ B60N 2/914 297/284.1 |
| 2009/0134677 | A1 | 5/2009 | Maly et al. |
| 2011/0101741 | A1 | 5/2011 | Kolich |
| 2012/0228278 | A1 | 9/2012 | Bohlender et al. |
| 2012/0261399 | A1 | 10/2012 | Lofy |
| 2013/0043320 | A1 | 2/2013 | Zhang et al. |
| 2013/0086923 | A1 | 4/2013 | Petrovski et al. |
| 2013/0097777 | A1 | 4/2013 | Marquette et al. |
| 2014/0090829 | A1 | 4/2014 | Petrovski |
| 2014/0130516 | A1 | 5/2014 | Lofy |
| 2014/0159442 | A1 | 6/2014 | Helmenstein |
| 2015/0183348 | A1 | 7/2015 | Zhang et al. |
| 2016/0052362 | A1 | 2/2016 | Thomas |
| 2016/0214514 | A1 | 7/2016 | Helmenstein |

FOREIGN PATENT DOCUMENTS

| | | |
|---|---|---|
| DE | 19824191 A1 | 12/1998 |
| DE | 19830797 A1 | 1/1999 |
| DE | 19927232 A1 | 12/1999 |
| DE | 19949935 C1 | 11/2000 |
| DE | 10047754 A1 | 4/2002 |
| DE | 102008052019 A1 | 6/2009 |
| DE | 102011114933 A1 | 4/2013 |
| EP | 0217752 A2 | 4/1987 |
| EP | 1075984 B1 | 5/2003 |
| EP | 2082919 A1 | 7/2009 |
| EP | 2113407 | 11/2009 |
| FR | 2905092 A1 | 2/2008 |
| WO | 2005/073020 A1 | 8/2005 |

OTHER PUBLICATIONS

Potentially Related U.S. Appl. No. 15/091,081, filed Apr. 5, 2016, published as 2016/0214514 on Jul. 28, 2016.
Potentially Related U.S. Appl. No. 14/574,599, filed Dec. 18, 2014, published as 2015/0183348 on Jul. 2, 2015, granted as U.S. Pat. No. 9,346,384 on May 24, 2016.
Potentially Related U.S. Appl. No. 14/824,154, filed Aug. 12, 2015, published as 2016/0052362 on Feb. 25, 2016.
Written Opinion from the European Patent Office for Application No. PCT/DE2016/000435.

\* cited by examiner

NECK FAN FOR A VEHICLE SEAT AND CONTROL METHOD THEREFOR

The present invention relates to a neck fan for a vehicle and a method for controlling the same.

Neck fans in headrests that can generate a temperature-controlled usable flow of air for cooling or warming a person located in the area of the headrest by means of the usable air flow are known in practice. The headrests can be equipped with a radial blower or an axial blower for air conditioning or ventilating the area around the head, shoulders and/or neck. When the windows are open or when drafts are present, the air conditioning or ventilation of the area around the head, shoulders and/or neck may not be satisfactory, since the air conditioning or ventilation may be influenced by driving wind entering the vehicle interior. These types of problems occur even inside closed vehicles, for example when a system for ventilating the vehicle interior is operated at high power. In such cases, to maintain satisfactory air conditioning or ventilation through a headrest the air conditioning or ventilation must be controlled manually.

DE 10 2013 012033 A1 discloses a heater fan of the type in question that can be used as a neck fan. The heater fan disclosed in the GE unexamined application includes an air conveying device and a heating device. Heater fans of this type can be adjusted manually to increase the volume of usable air flow or to raise or lower the output of the heater fan.

The object of the invention is to achieve a uniform and convenient temperature control of the areas around the head, shoulders, and neck of a passenger. In particular, the aim is to enable improved air conditioning and temperature control, even in open vehicles. The object of the invention is further to provide a method by which this is possible. The headrest and the vehicle seat should also have a simple structure. Furthermore, the method should be easy to implement.

A neck fan, a vehicle seat, and a control method according to the independent claims are therefore proposed here. Additional advantageous embodiments are specified in the description and the dependent claims.

The invention relates to a neck fan for ventilating or controlling the temperature around the neck of a passenger, and/or for compensating for driving wind and interfering air currents in that area, as desired.

The neck fan has at least one air conveying device for generating a usable air flow.

The neck fan has at least one temperature control device for controlling the temperature of the usable air flow generated by means of the at least one air conveying device. The temperature control device is preferably a heating device, in particular a PTC heater.

A usable air flow can thus be generated by means of at least one air conveying device, and the at least one heating device can be acted on by the usable air flow for controlling the temperature of the usable air flow. The at least one heating device can thus be disposed downstream of the at least one air conveying device in the flow direction of the usable air flow.

The neck fan further preferably has a control device for controlling the output of at least one air conveying device and/or at least one heating device, preferably dependent upon at least one environmental parameter.

The control device is preferably connected electrically to the at least one air conveying device and/or the at least one heating device. Expediently, information regarding interfering air currents that are identified and/or detected in the region of the headrest can be provided to the control device. For example, the information can be provided to the control device via a LIN communication link. When a window, a convertible top, and/or other components of a vehicle are open, the control device can be notified of the open component via the LIN communication link. Based on this information, the control device can then identify interfering currents that form in the region of the headrest. Alternatively, the control device can retrieve appropriate parameters for operating the neck fan in a given case from a data memory.

Furthermore, the control device can establish a relationship between the interfering air current and the influence on the usable air flow that is generated in the region of the neck rest and/or seat back. For this purpose, the control device can be equipped with an algorithm for analyzing information acquired by sensors regarding the interfering air current and/or information regarding the interfering air current supplied via the LIN communication link, and where necessary, for deriving measures for influencing the temperature-controlled usable air flow emerging from the neck fan of a headrest.

At least one air conveying device can be controlled via the control device to adjust the volume and/or the direction of the temperature-controlled usable air flow, taking into account the relationship that is established. In particular, at least one air conveying device can be controlled such that the flow conditions of the temperature-controlled usable air flow in the region of the neck rest or in the area close to the neck fan of the headrest remain at least approximately homogeneous over time. The temperature-controlled usable air flow can thus be controlled in such a way that the control device substantially compensates for the interfering air current by adjusting the volume and/or the direction of the temperature-controlled usable air flow. At least approximately constant flow conditions are thereby produced in the region of the headrest or in the region close to the neck fan of a headrest. This is accompanied by ventilation and cooling of the neck and/or shoulder region of a passenger that remains approximately constant over time.

In particularly preferred embodiments, at least one air conveying device can have at least one aperture, the opening cross-section of which can be adjusted via the control device to adjust the volume of air in the temperature-controlled usable air flow. At least one aperture can have or be composed of flow guiding elements, for example in the form of a grille or one or more louvers arranged adjacent to one another. The orientation of these guiding elements can preferably be varied to adjust the volume of air in the temperature-controlled usable air flow. For this purpose, an actuator can be provided, which is connected to the control device and is coupled to the aperture for the purpose of adjusting the opening cross section.

It is also possible for at least one air conveying device to have at least one blower, which can be pivoted via the control device to adjust the direction of the temperature-controlled usable air flow. The at least one blower may be embodied as an axial blower and/or a radial blower. A pivot axis of the blower is oriented aligned with or parallel to the rotational axis of the impeller.

The flow guiding elements may be embodied as part of the above-described aperture or as separate therefrom.

It is further possible for the at least one heating device to be controllable via the control device, taking the established relationship into account, to adjust the heating output used for the temperature-controlled usable air flow. When an interfering air current increases in magnitude, the at least one heating device can be actuated to apply a greater amount of heating energy or cooling energy to the usable air flow. When an interfering air current decreases in magnitude, the at least one heating device can be actuated to apply a smaller amount of heating energy or cooling energy to the usable air flow.

It is further conceivable for the neck fan to have at least one sensor connected to the control device, with which the interfering air current in the region of the headrest can be directly and/or indirectly determined. The at least one sensor can be embodied as a flow sensor and/or as a temperature sensor.

It is also conceivable for the neck fan to have at least one first air conveying device and at least one second air conveying device, which are connected to the control device. In that case, the at least one first air conveying device and the at least one second air conveying device can be controlled independently of one another via the control device to adjust the respective volume and/or the respective direction of each temperature-controlled usable air flow, taking the established relationship into account. The first air conveying device can be positioned in the headrest or in the neck fan such that the first air conveying device can be designed to apply a usable air flow to the right side of a passenger's neck. A second air conveying device is positioned in the headrest or in the neck fan such that the second air conveying device is designed to apply a usable air flow to the left side of a passenger's neck. The first air conveying device and the second air conveying device can each comprise at least one blower, which may be embodied as an axial blower and/or radial blower, as needed.

When interfering air currents in the vehicle interior are generated inhomogeneously, usable air flows should be supplied in different regions, in different volumes and/or directions. A usable air flow generated by means of the at least one first air conveying device can thus be greater or smaller than the usable air flow generated by means of the at least one second air conveying device, dependent upon the interfering air current in each case.

It is further possible for at least one first heating device to be assigned to a first air conveying device and at least one second heating device to be assigned to at least one second air conveying device. The first and second heating devices can be controllable independently of one another to adjust the heating output of each.

The invention further relates to a vehicle seat that has one or more such neck fans. The vehicle seat further includes a seat surface provided for one person or a seat cushion and a seat back with a headrest provided for one person.

The invention also relates to a method for controlling at least one temperature-controlled usable air flow generated in the region of the headrest of a vehicle seat.

Features described herein in reference to headrests can also be provided for conceivable embodiments of the method, and will therefore not be mentioned redundantly. The method according to the invention includes essentially the following steps:
  identifying and/or detecting an interfering air current acting on the target region of the neck of a passenger and/or on at least one usable air flow in the region of the headrest/neck fan,
  establishing a relationship between the interfering air current and the necessary influence on the at least one usable air flow generated in the region of the headrest/neck fan,
  adjusting the flow direction and/or the volume of the at least one temperature-controlled usable air flow, taking into account the relationship established between the interfering air current and the influence of the at least one temperature-controlled usable air flow generated in the region of the headrest/neck fan.

In particular, it can be provided that the direction of flow and/or the volume of the at least one temperature-controlled usable air flow are adjusted at least approximately in real time during the identification and/or detection of the interfering air current.

It is further possible for the temperature level of the temperature-controlled usable air flow to be adjusted, taking into account the relationship established between the interfering air current and the influence of the temperature-controlled usable air flow generated in the region of the headrest.

In practice, it has proven expedient for the usable air flow to pass through an aperture, and for the opening cross-section of the aperture to be modified to adjust the usable air flow, thereby altering the flow-through volume or flow-through rate. In so doing or for this purpose, the orientation of flow guiding elements can also be adjusted.

In addition, it is possible for at least one blower and at least one heating device to cooperate to generate the at least one temperature-controlled usable air flow. In that case, the blower is pivoted to adjust the direction of flow, and/or the output of the blower is controlled to adjust the volume of the usable air flow.

It is also conceivable for the output of the at least one heating device to be controlled via the control device, taking the established relationship into account.

At least one first blower and at least one first heating device can also cooperate to generate a first temperature-controlled usable air flow. Furthermore, at least one second blower and at least one second heating device can cooperate to generate a second temperature-controlled usable air flow, in which case the output of the at least one first blower and the output of the at least one second blower are controlled independently of one another, taking the relationship into account.

Alternatively or additionally, the output of the at least one first heating device and the output of the at least one second heating device may be controlled independently of one another, taking the relationship into account.

Neck fans for a vehicle seat for generating a usable air flow emerging from the neck fan toward a passenger are often provided with at least one air conveying device for generating a usable air flow in the region of a headrest or the upper end of a seat back. If one or more compensating means are provided, which can compensate for asymmetrical climatic conditions caused by interfering currents in the area around a passenger, and if one or more compensating means act asymmetrically on the usable air flow or impart an asymmetry, relating to at least one geometric or thermodynamic parameter, to the cross-section of the usable air flow at least in the region of the outlet of the neck fan, this improves the homogeneity and symmetry of the climate in which the passenger is seated.

The asymmetry of the climatic conditions preferably relates to a deviation from a mirror symmetry, in particular with respect to a plane that is spanned by the longitudinal axis of a passenger and his viewing direction. The same can apply to the asymmetry of the action on a usable air flow or to the usable air flow itself. If necessary, however, this asymmetry may also relate to the longitudinal axis of the usable air flow. It can also relate to a plane that is spanned by a vertical and by a flow direction of the usable air flow at an outlet cross-section or at an outlet opening cross-section, in particular at the centroid of such a cross-sectional area.

Suitable compensating means include, for example, flow guiding elements, adjustable apertures, and an asymmetrically disposed or asymmetrically controllable temperature control device, in particular a heating or cooling device. It is also possible, however, for a plurality of temperature control devices and/or air conveying devices to be provided, which are then operated at different output levels to generate asymmetry in their overall effect.

For optimum compensation of interfering air currents, it may be expedient for at least one outlet to include a plurality of outlet openings, which are arranged adjacent to one another or spaced from one another to cooperatively expel the usable air flow from the neck fan toward the passenger. This relates in particular to a first outlet opening to the left of a passenger's neck and a second outlet opening to the right of the passenger's neck.

For this purpose, it is also helpful for the neck fan to be controlled in at least one operating mode in a way in which this asymmetry of the usable air flow relates to at least one of the following parameters thereof: the distribution of the temperature profile over the outlet, the distribution of the flow velocity over the outlet, the distribution of pressure over the outlet, the spread of the outflow angle over the outlet, and the degree of deviation of the outflow direction of a homogeneously directed usable air flow from the longitudinal direction of the vehicle.

This is true particularly when the magnitude of the parameter that is realized asymmetrically in the usable air flow increases, at least partially, in the horizontal direction along the outlet of the neck fan, from the vehicle center axis toward an outer side of the vehicle, or is directed toward the vehicle outer side.

A particularly efficient and rapid adjustment is achieved,
  when, to compensate for asymmetries in the neck region, at least one of the following parameters of the usable air flow can be influenced: its direction of flow, the shape of its dispersion cone, its temperature, its velocity, and its pressure, and
  when at least one of the following functional components is provided as compensating means: a temperature control device, a heating device, a cooling device, an air conveying device and/or a flow guiding element.

This is true particularly when the neck fan has at least second of said functional components, preferably in redundant number, in particular two temperature control devices, two air conveying devices and/or two flow guiding elements.

It is further desirable for the neck fan to have at least second types of said functional components in at least a dual implementation, preferably two temperature control devices and two air conveying devices or two air conveying devices and two flow guiding elements.

Automatic control is achieved when the neck fan includes a control device that in at least one operating mode influences the usable air flow, preferably asymmetrically with respect to the longitudinal axis of the usable air flow and/or the vehicle, and preferably based upon data acquired in the vehicle.

A neck fan can be efficiently controlled especially when at least one air conveying device includes at least one of the following components:
  an aperture, the opening cross-section of which can be adjusted, preferably via the control device, to adjust the volume of the temperature-controlled usable air flow.

A blower that is mounted pivotably to adjust the direction of the usable air flow.

A flow guiding element, the orientation of which can be adjusted to adjust the direction of the temperature-controlled usable air flow.

An advantageous neck fan for this purpose is one having
  at least two air conveying devices (8'), the output of which is preferably independently controllable, and
  at least two heating devices, the heating output of which is preferably independently controllable.

A particularly flexible neck fan results when at least one air conveying device is assigned to a subset of a plurality of temperature control devices, and/or when at least one temperature control device is assigned to a subset of a plurality of air conveying devices, in which case the subset may be a set of one.

A vehicle seat having such a neck fan and a vehicle having such a seat are obviously climatically more comfortable.

A control method for controlling at least one usable air flow that emerges in the region of a headrest of a vehicle seat from an outlet of a neck fan expediently includes the following steps:
  detecting an interfering air current acting on the usable air flow,
  determining the nature and/or intensity of a compensation response for appropriately influencing the usable air flow, preferably depending upon the nature and/or intensity of the interfering air current,
  implementing the determined compensation response by generating a usable air flow that emerges from the outlet of the neck fan, asymmetrically with respect to at least one thermodynamic parameter relative to the longitudinal axis of the vehicle and/or of the usable air flow.

Such a control method is particularly effective
  when the compensation response includes an adjustment of the direction of flow, the outflow angle, the velocity, the temperature, the pressure and/or the distribution of at least one of these parameters horizontally within the usable air flow, and
  when the adjustment response is preferably implemented at least approximately in real time.

A simple control method can be provided, in which the usable air flow passes through an aperture, and the opening cross-section of the aperture is increased or decreased to adjust the pressure and/or the volume flow rate of the at least one temperature-controlled usable air flow.

In a preferred, particularly thermally effective control method, at least one blower and at least one temperature control device cooperate to generate the usable air flow,
  the temperature control device preferably being or having a cooling device or a heating device,
  the at least one blower being pivoted to adjust the direction of flow,
  the output of the at least one blower being controlled to adjust the usable air flow, and/or
  the output of the temperature control device being controlled via the control device.

For automatic control, a control method in which the interfering air current acting on the usable air flow is detected by sensors is useful.

For convenient heating and ventilation, a desirable control method is one
  in which at least one first blower and at least one first heating device cooperate to generate a first partial usable air flow, in which at least one second blower and at least one second heating device cooperate to generate a second partial usable air flow, in which the output of the first blower and the output of the second blower are controlled independently of one another to implement the intended compensation response, and/or in which the output of the first heating device and the output of the second heating device are controlled independently of one another to implement the intended compensation response.

The goal of all the described effects on the temperature-controlled usable air flow is to keep the resulting usable air flow substantially constant with respect to its direction of flow and/or its flow cone and/or its temperature.

In the following, details of the invention will be explained. These embodiments are intended to clarify the invention. However, they are merely exemplary in character. Of course, within the scope of the invention defined by the independent claims, one or more described features may also be omitted, modified, or supplemented. And of course, the features of different embodiments may also be combined with one another. What is important is that the concept of the invention be substantially implemented. Where a feature is at least partially implemented, that feature is considered to be fully implemented or substantially fully implemented. "Substantially" in this context means, in particular, that the implementation allows the desired benefits to be achieved to a noticeable extent. In particular, this can mean that a corresponding feature is at least 50%, 90%, 95% or 99% implemented. If a minimum quantity is specified, more than this minimum quantity can obviously also be used. If the number of a component is specified as at least one, this also includes embodiments having two, three or any other multiple number of components. Descriptions relating to one object can also be applied to the majority of or all other similar objects. Unless otherwise stated, intervals include their boundary points. "Alan" is hereinafter meant as an indefinite article and may mean "a single" but also "at least one". In the following, reference will be made to:

FIG. 1 a schematic view of a vehicle having a neck fan according to the invention.

Figure 2:
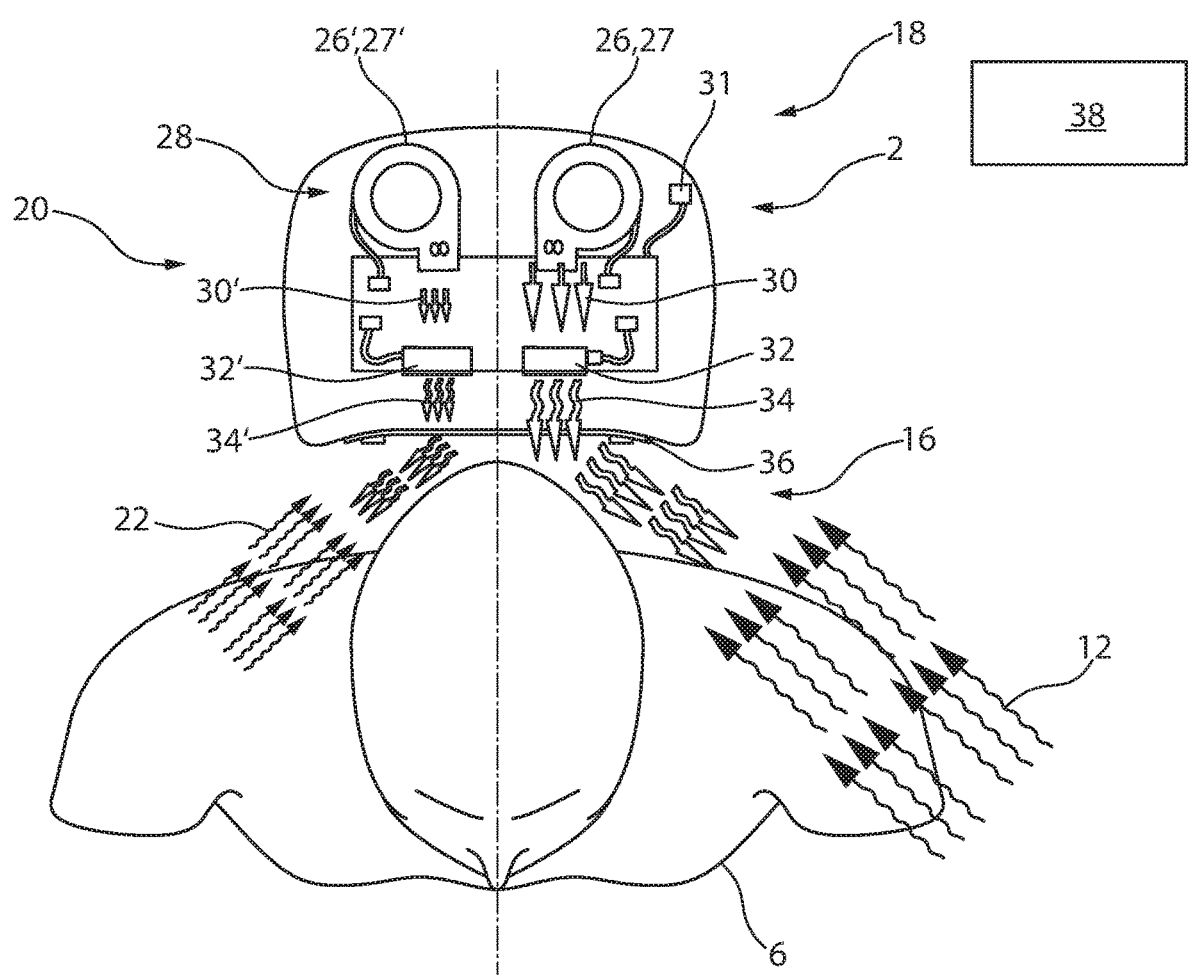
Figure 3:
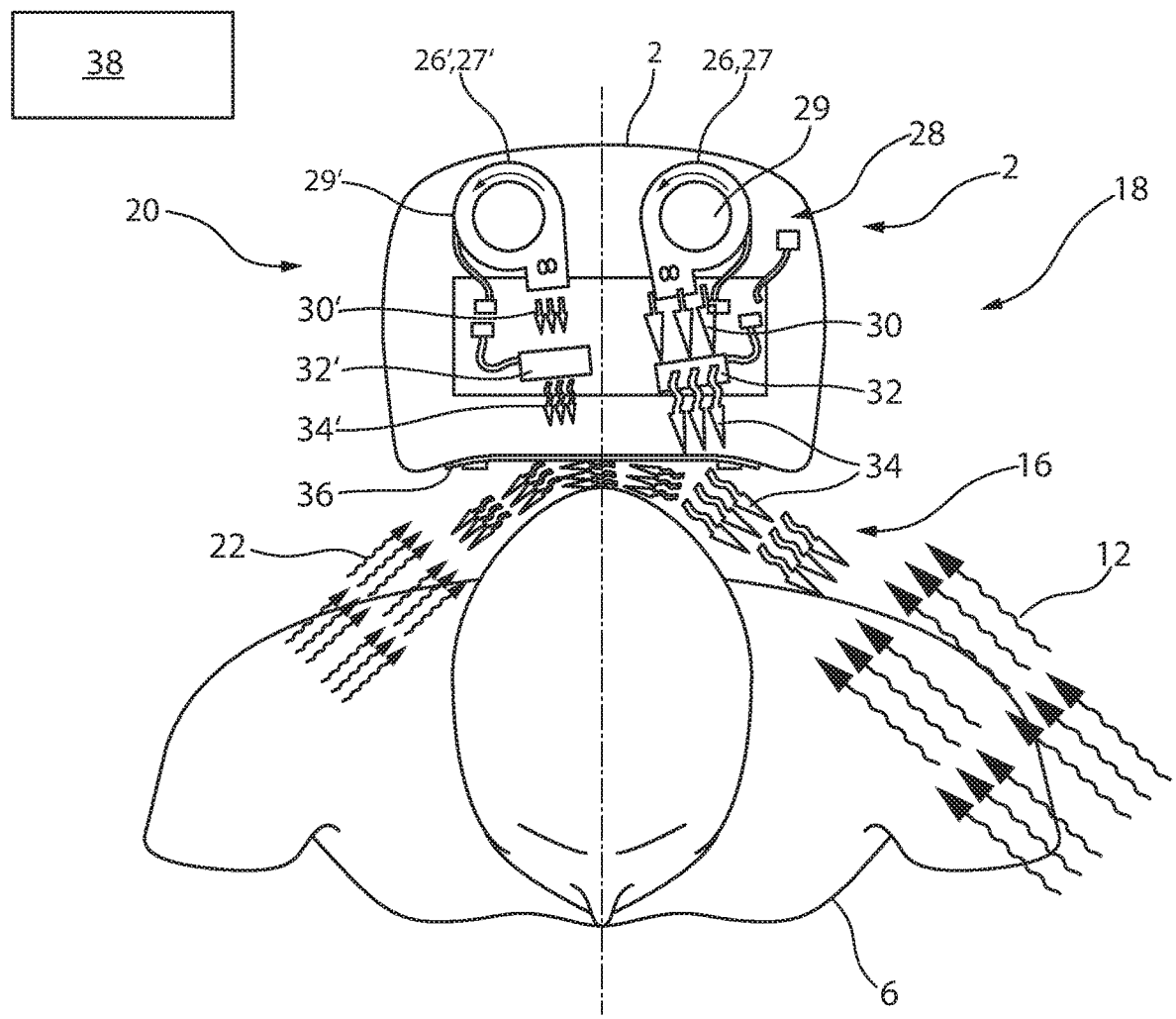
Figure 4:
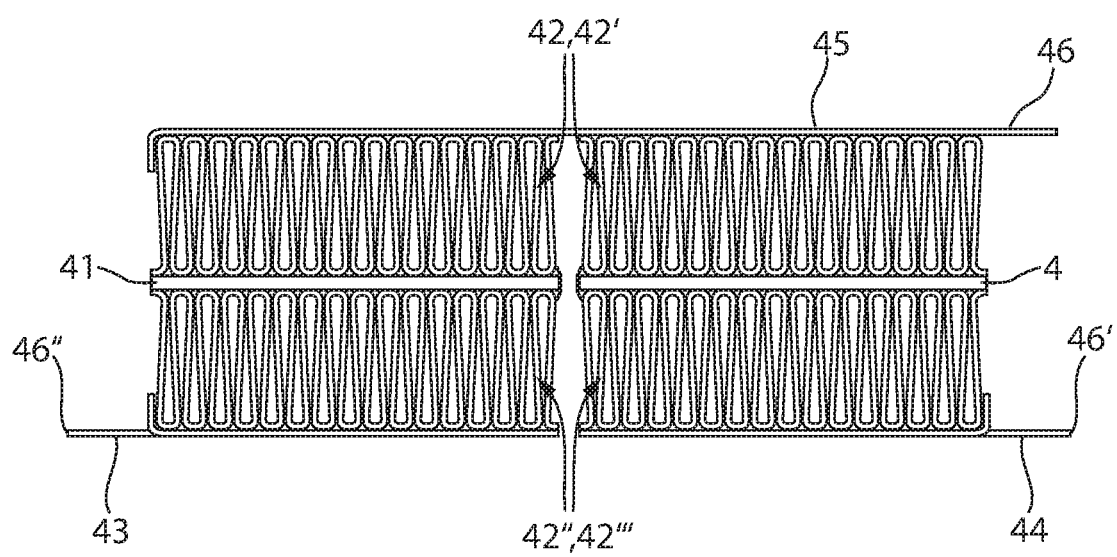

FIG. 2 an enlarged detail view of a headrest of the vehicle with the neck fan according to the invention;

FIG. 3 the headrest of FIG. 2 with the neck fan in a different operating mode;

FIG. 4 a heating device, such as is used for the neck fan of FIGS. 2 and 3.

Figure 5:
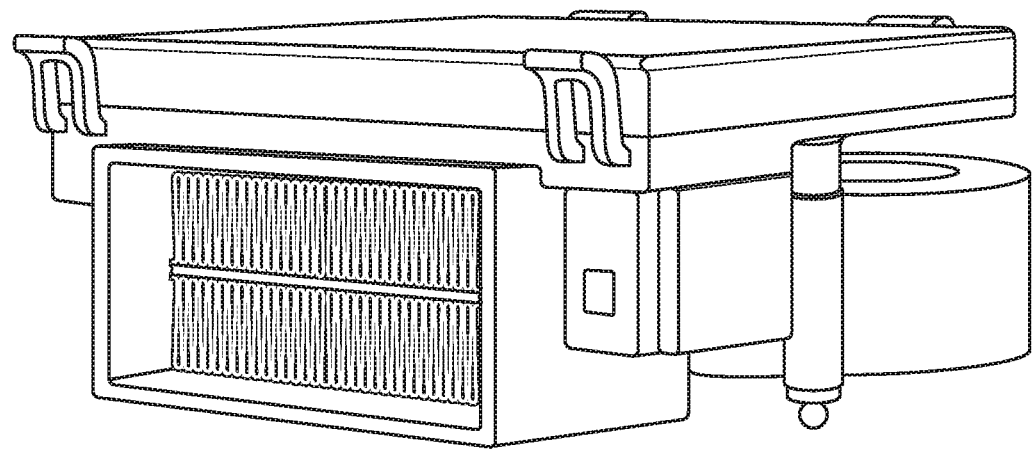
Figure 6:
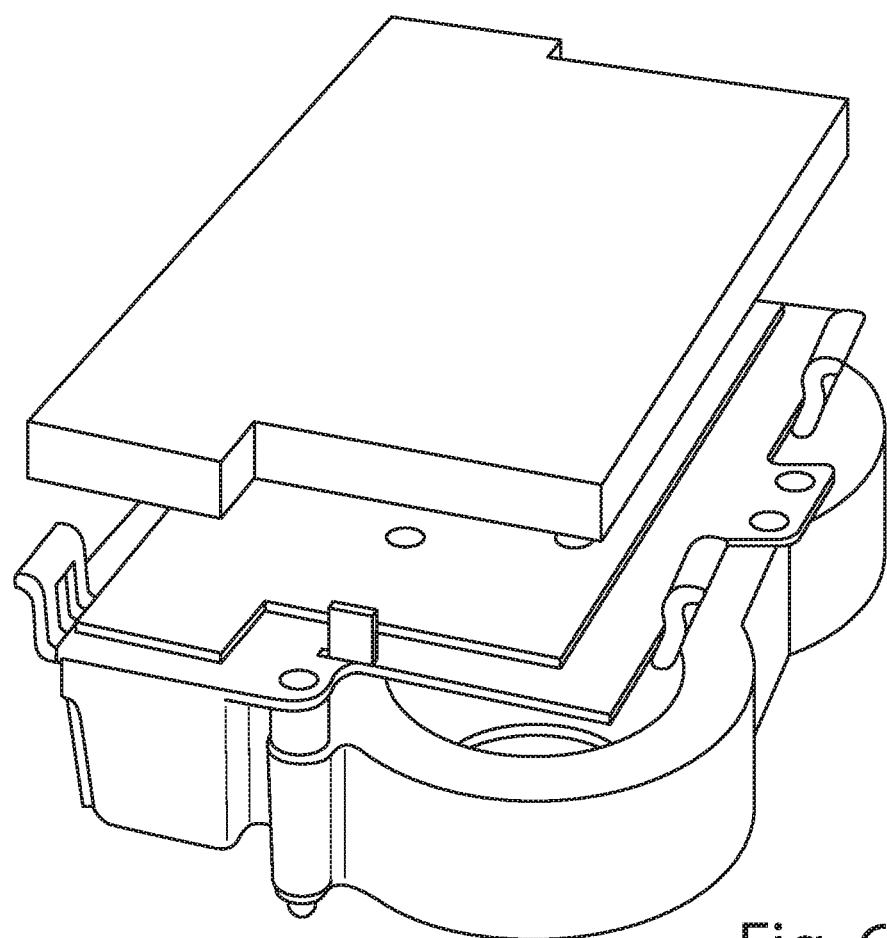
Figure 7:
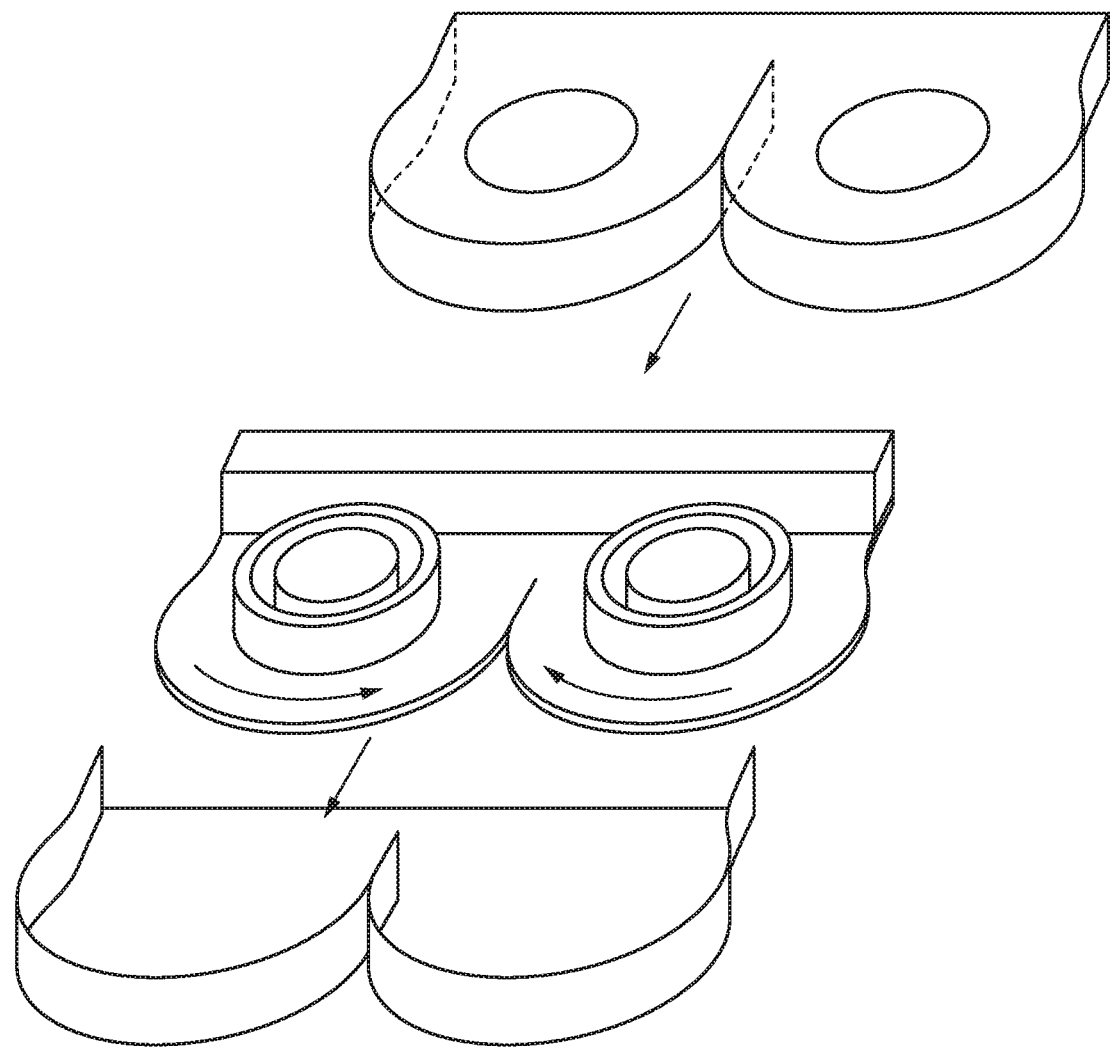

FIG. 5 a perspective view of the neck fan of FIGS. 2 and 3 laterally from the front FIG. 6 a perspective view of the neck fan of FIG. 5, laterally from above, in an exploded view FIG. 7 a second embodiment of a neck fan in an exploded view from above at the front FIG. 1 shows a schematic view of a vehicle 4, with vehicle seats 8, 8' and the headrests 2, 2' thereof. In the present case, vehicle 4 is embodied as a motor vehicle, in particular as an automobile, but in other embodiments it may also be embodied as a watercraft, a railcar, or an aircraft.

A passenger 6, 6' is seated in each of the vehicle seats 8, 8'. Each of the two headrests 2,2' has a neck fan 28, 28', via which the head, shoulder, and/or neck region 16, 16' of the respective passenger 6, 6' can be ventilated and temperature controlled. The operation of the neck fans 28, 28' will be described in the subsequent figures.

In FIG. 1, the driver side window 10 and the passenger side window 10' of vehicle 4 are open, so that interfering currents 12 and 12', respectively, are entering the vehicle interior 14 in the area of the respective window sides 18, 18'. The interfering air currents 12 and 12' influence the ventilation and temperature control of the neck regions 16 and 16', respectively, where they generate swirling air currents that are undesirable in practice. Interfering currents 22 and 22' can also develop in the region of interior sides 20 and 20', which face away from window sides 18 and 18', respectively. For example, interfering currents 22 and 22' may be generated by a ventilation system 24 positioned in the vehicle interior 14, or may be moved by the more distant driver side window 10 or passenger side window 10' in each case, toward the head, shoulder, and/or neck region 16 or 16' of the more distant passenger 6 or 6' in each case.

Headrest 2 has a neck fan 28, which in the exemplary embodiment of FIGS. 1 to 6 includes two air conveying devices 26 and 26' for generating usable air flows 30 and 30', respectively. These air conveying devices are formed by blowers 27 and 27'.

In addition, neck fan 28 has two temperature control devices 31, in this case two heating devices 32 and 32'. Each air conveying device 26 and 26' is assigned its own heating device 32 or 32', respectively. Usable air flows 30 and 30' can be heated via heating devices 32 and 32', respectively. If such a temperature control device contains a cooling device or is composed of such a device, the air can also be cooled, or the temperature thereof controlled accordingly.

Further provided is a control device 38. Control device 38 is connected to air conveying devices 26 and 26' and to heating devices 32 and 32'. For example, a serial bus communication system, in particular a LIN system, may be provided, via which control device 38 is informed as to whether a driver side window 10 and/or a passenger side window 10' are open and/or whether a ventilation system 24 is in operation. This enables control device 38 to infer the presence of a respective interfering air current 12 or 22. It is also possible for at least one sensor (not shown) for directly or indirectly detecting interfering currents 12 and 22 to be positioned in the region of headrest 2 or in the region of the head, shoulder, and/or neck region 16. Control device 38 can be connected to the at least one sensor. The at least one sensor may be embodied as a flow sensor, a pressure sensor, and/or a temperature sensor. In practice, for example, embodiments have proven advantageous in which two or more NTC sensors are provided, which detect surface temperatures on the surface of an aperture 36 and transmit information in this regard to control device 38. It is also possible for at least one infrared sensor to be provided, which is provided for identifying or detecting the skin temperature of a passenger 6. Control device 38 can be connected to the at least one infrared sensor. Based upon the skin temperature ascertained by the infrared sensor, control device 38 can arrive at information regarding the interfering air currents 12 and 22 and can identify measures for appropriately influencing the temperature-controlled usable air flows 34 and 34'.

Control device 38 preferably ascertains the nature and intensity of an interfering current by analyzing one or more state parameters, e.g. the degree of opening of windows, performance data for a vehicle air conditioning system, the temperature, the amount of solar irradiation, and/or pressure conditions, and/or the change in such values over time. It obtains these data via sensors in the region around the neck of a passenger and/or via a central vehicle control unit. Based upon the acquired data concerning the interfering current, the control device then identifies appropriate measures for responding to the interfering current, designed to compensate for the interfering current. Control device 38 can also be designed to establish a relationship between the interfering current and the influence on the temperature-controlled usable air flow 34 generated in the region of headrest 2. Further, air conveying devices 26 and 26' can preferably be controlled independently of one another to adjust the volume and/or the direction of the respective temperature-controlled usable air flow via control device 38, e.g. taking the established relationship into account. FIG. 2 shows a strong interfering current 12 in the region of window side 18, whereas in the region of interior side 20 only a slight interfering current 22 is formed. Air conveying device 26 that is assigned to window side 18 is thus controlled to operate with increased output, and therefore, usable air flow 30 is increased in volume due to the strong interfering current 12. In contrast, air conveying device 26 that is assigned to interior side 20 is controlled to operate with a reduced or constant output, and therefore, usable air flow 30 is not increased or is increased only slightly in volume due to the weak interfering current. By increasing the usable air flow 30, i.e. by increasing the mass and/or the volume of the conveyed air, interfering current 12 can be counteracted, so that the ventilation and temperature control of passenger 6 in the head, shoulder, and/or neck region 16 are maintained at least largely without impairment.

In the operating state shown in FIG. 2, the output rate of air conveying devices 26 and 26' is increased or decreased as required, by means of control device 38, to adjust the mass and/or volume of the temperature-controlled usable air flow 34, 34. However, it is alternatively or additionally possible for aperture 36 to have an opening cross-section that can be increased and decreased in size to adjust the volume of the temperature-controlled usable air flow 34, 34'. In particular, aperture 36 can have a plurality of louvers for this purpose, the orientation of which is adjustable. The flow volume and/or the flow velocity of the usable air flow 34, 34' can thereby be adjusted. In this way, it can be throttled, in particular, or adjusted with respect to its direction of flow, its swirl, or its degree of flow expansion.

FIG. 3 shows a further operating state in which the neck fan according to the invention can be operated. For adjusting the usable air flow 34, 34', it can preferably be additionally or alternatively provided that the direction of flow thereof from an outlet can be changed. For this purpose, air conveying devices 26, 26' can be pivoted about an angle of rotation to adjust the direction of usable air flow 30, 30', 34, 34'. The angle of rotation is preferably determined by control device 38, dependent upon the interfering current 12, 22. Each of blowers 27, 27' is equipped with an impeller 29, 29'. A pivot axis for each of the blowers 27, 27' extends along the axis of rotation for the respective impeller 29, 29'. As is clear from FIG. 3, an interfering current 12 in the region of a window side 18 is shown as greater than an interfering current 22 in the region of an interior side 20. In such a situation, a blower 27 that is assigned to the window side 18 is pivoted about a greater angle of rotation than a blower 27' that is assigned to the interior side 20. In this way, interfering currents 12 and 22 can be at least approximately compensated for, so that at least approximately constant current conditions prevail over time, or at least approximately constant temperature control can be carried out over time in the head, shoulder, and/or neck region 16 of passenger 6.

In one conceivable embodiment of the method according to the invention, in a first step an interfering current 12, 12' 22, 22' acting on the passenger and/or on the at least one usable air flow 34 or 34' in the region of headrest 2 or 2' is detected.

Thereafter, in a second step, a suitable new flow direction of the usable air flow 34, 34' or a suitable adjustment of the old flow direction thereof is determined. The extent to which an adjustment of the previous volume flow rate is required is also determined, and/or a new output volume or output rate is established. A relationship could also be established between the interfering current 12, 12', 22, 22' and the influence of the at least one temperature-controlled usable air flow 34 or 34' that is respectively formed in the region of headrest 2 or 2'.

In the third step, the flow direction of usable air flow 34, 34' and/or the output rate of at least one air conveying device 26, 26' are then adjusted. In this way, an at least approximately constant temperature control of the head, shoulder, and/or neck region 16 or 16' of a respective passenger 6 or 6' can advantageously be effected.

In the vehicle, swirling air currents that differ in terms of their orientation and intensity can occur as a result of different operating and environmental conditions (roof open or closed; windows open or closed; convertible top with or without wind deflector; different speeds and different environmental temperatures).

It is therefore expedient for the neck fan to readjust its required air volume and its heating output asymmetrically and preferably automatically.

For this purpose, the output rate of at least one air conveying device can preferably be controlled independently of at least one heating output of at least one heating device.

If a neck fan has a plurality of air conveying devices, these can preferably be controlled independently of one another. If a plurality of heating devices are provided, these too can preferably be controlled independently of one another. This enables an optimal adjustment to the operating and environmental conditions in each case. In each case a plurality of spatially separated and spaced apart modules of air conveying device, temperature control device, and/or aperture can cooperate as a neck fan. This uncoupled control also enables the same neck fan to be used in different installation locations (i.e., for example on both the driver side and the passenger side).

An additional automatic influence on the outflow direction results in an optimal adjustment to the respective operating and environmental conditions, without intervention by the user. The necessary data regarding the individual states and conditions (e.g. speed, external temperature, roof open, etc.) can be supplied, for example, via a LIN communication link for controlling the module. Data could also be acquired separately via sensors of any type (e.g. infrared thermometers for detecting the temperature of the skin, for example on the neck, or the surface temperature of the clothing, or the air outlet aperture; two or more NTC sensors that detect surface temperature changes at different locations on the outlet or on an air outlet aperture; backpressure sensors, etc.), which are positioned in the temperature control or heating module or in one of the surrounding components. A control algorithm is used to adjust the volume flow rate to be provided and/or the required heating output of the heating module.

The output of at least one heating device and/or at least one air conveying device can be controlled, taking into account data that are acquired or supplied by the vehicle. In this way, an asymmetric counterflow that arises as a result of vehicle and environmental conditions, and an uneven flow into the associated area in question can be compensated for, and a symmetrical distribution of warm air in the area in question can be achieved.

It may be expedient to combine a plurality of heating devices to form a single heating device, as shown in FIG. 4. For this purpose, a plurality of heating devices preferably are not simply interconnected electrically in series or in parallel. Rather, they have at least one shared mechanically load-bearing component. In addition, each preferably has at least one electrically conductive load-bearing component that is functionally identical but that cannot be used by the other heating device. In FIG. 4, two small, flat PTC heating panels 41, 41' are provided. Each of these carries on its two surfaces corrugated heat conducting plates 42, 42', 42", 42''', which help to transfer heat from the small PTC heating panels 41, 41' to air flowing through the heat conducting plates. Each of the small PTC heating panels is assigned its own potential terminal 43, 44 via a heat conducting plate on its one surface, this terminal forming part of a supporting structure in the form of a contact plate. In addition, each of the small PTC heating panels is assigned a common potential terminal 45 via a heat conducting plate on its other surface, which connection forms a further part of a supporting structure in the form of a common contact plate.

In such a heating device, an electric potential can be applied to at least two, preferably to all PTC heating panels independently of one another, each at its own potential terminal. To the extent that this deviates from the potential at the common contact plate, the respective heating device receives the energy required there at that moment for heating.

At least one of the potential terminals can have a protruding contact region 46, 46', 46", which facilitates the contacting of the potential terminal, e.g. via soldering or plug connections. In the simplest case, such a contact region projects in the form of a sheet extension beyond the section that is required by a respective heating device. However, at least one contact region can also be bent or curved one or more times, so that all contact areas can be installed simultaneously with a single movement, e.g. by plugging or inserting the heating device into a multi-pin connector.

A portion of the increased heating output on the window side is channeled toward the interior of the vehicle by an increased opposing wind. If the heating device is composed of a plurality of heating devices, as in FIG. 4, it may be expedient to operate the different partial heating devices at different heating output levels when the windows are lowered. In that case, e.g. the heating output of a component of the heating device disposed centrally in the vehicle may be lower than the heating output of a component of the heating device provided on the outer side of the vehicle. A uniform distribution is nevertheless achieved. The same applies similarly to the air output rate when a plurality of blowers is provided. The adjustment can be made by increasing or reducing the output of the components (air conveying device and heating device) and by a separate or coordinated output adjustment.

An automatic mechanical adjustment of the angle of incidence of the module components likewise enables a symmetrical flow into the affected area despite an asymmetrical opposing current.

To achieve an optimal effect, a variable direction of rotation with different angles is possible. This is possible for individual heating devices or air conveying devices, or for a plurality of these.

An automatic aperture or flap adjustment can likewise effect a symmetrical flow into the affected area, despite an asymmetrical opposing flow.

It can be expedient for a neck fan to have at least one target area sensor, which is connected to control device 38 and which directly and/or indirectly ascertains the interfering current 12, 12', 22, 22' in the region of headrest 2, 2'. These include, for example, a flow sensor and/or a temperature sensor.

The neck fan is preferably integrated into the upper region of a seat back, into a headrest, and/or into a roofliner, or is mounted thereon.

In the prior art, neck fan and control device are separate units. They can therefore be installed only in headrests that are specially designed for this purpose.

The invention therefore further relates to a neck fan 28 having
- at least one air conveying device 26 for conveying a usable air flow,
- at least one temperature control device 31 for controlling the temperature of the usable air flow,
- at least one control device 38 for controlling at least one air conveying device 26 and/or at least one temperature control device 31.

Control device 38, at least one air conveying device 26, and at least one temperature control device 31 form a modular unit. A neck fan of this type is small and compact.

It is less than half the size of previous neck fans on the market. As a result, it can be integrated into a variety of common headrests and integral seats.

Particularly useful is has a neck fan in which the control device includes at least one carrier 50 having at least one of the following features:

Electrical functional components of the control device are mounted on the carrier.

The carrier and the plane of rotation of two impellers are arranged longitudinally in relation to one another.

The carrier is a plate.

The carrier is at least substantially rectangular in shape.

The width of the rectangle corresponds approximately to the diameter of an impeller to which a temperature control device is connected upstream.

The length of the rectangle corresponds approximately to the diameter of two impellers.

"Approximately" in this case means with a maximum tolerance of twice the specified value, and a minimum tolerance of one-half the specified value.

It is also useful for the control device to include at least one carrier 50 on which electrical functional components of the control device are mounted, and to which at least one temperature control device and at least one air conveying device are attached. The carrier preferably has at least one of the following characteristics:

The carrier is an electrical circuit board (printed circuit board).

The carrier is a component of a control device of a temperature control device and carries electrical circuits for controlling the output of the temperature control device.

The carrier is preferably also a component of a control device of an air conveying device, and carries electrical circuits for controlling the output of the air conveying device.

The carrier carries a stator 5 of at least one impeller or of at least one radial blower, preferably of two radial blowers.

The carrier carries at least two radial blowers.

A control device of this type thus controls at least one blower and/or at least one temperature control device.

It preferably controls all of the temperature control devices provided in the neck fan and all blowers.

At least one contact plate of a PTC heating element is preferably connected and soldered to the electrical circuit board. Preferably, all electrically contacted contact plates of a PTC heating element are plugged into the electrical circuit board in the same insertion direction and are soldered to the circuit board on a side of the circuit board opposite the PTC heating element. This type of assembly is quick and saves on cable.

Two impellers preferably have at least one of the following features:
- The axes of rotation of the two impellers are arranged parallel to one another.
- The impellers rotate in the same plane of rotation.
- The axes of rotation of the impellers are angled in relation to the flow direction of the usable air flow expelled by the respective air conveying device. Angled in this case more particularly means perpendicular.
- The axes of rotation of the impellers are angled in relation to the flow direction of the usable air flow expelled by the respective air conveying device. Angled in this case more particularly means perpendicular.
- The axes of rotation of the impellers are arranged mirror-symmetrically to one another in relation to a usable air flow expelled by the neck fan.
- The axes of rotation of the impellers are arranged mirror-symmetrically to one another in relation to the longitudinal axis of the neck fan.
- The impellers are a component of radial blowers.
- The distances between the two axes of rotation of the impellers are greater than the sum of the radii of the two impellers.

The impellers are disposed in helical housings or housing sections 65, which are arranged mirror-symmetrically to one another.

The two impellers rotate in opposing directions of rotation.

In such an arrangement, the two impellers can also be mirror-symmetrical to one another. However, since this requires the impellers to be arranged in mutually opposite orientations, two mirror-symmetrical types of impellers are required.

It is therefore particularly cost-effective for two impellers of identical shape to be used. In that case, one of the impellers is installed upside down. That is, the stators of the two impellers are mounted on opposite sides of the plane of rotation. The two impellers therefore rotate in the opposite direction of rotation relative to one another. However, each rotates in the same direction as its respective stator.

The two impellers preferably draw air in axially along their axis of rotation and expel it radially. The axial intake of air into the impeller takes place from at least one side of the plane of rotation, as shown in FIG. 7. More particularly, air enters a housing 60 via a through opening 70 on a side thereof that faces away from control device 60.

However, air can also enter the impeller axially from both sides of the plane of rotation. In that case, air enters, in particular, via a through opening in a housing 60 on a side that faces away from control device 60. Air is also taken in through a lateral gap 74 between control device and impeller. This arrangement makes it possible to generate a high air flow rate despite a small size.

An advantageous neck fan, shown in FIG. 6, having a carrier 50 in a housing 60 has at least one of the following features:
- Housing 60 has at least one holding section 62, on which the neck fan can be connected to the seat.
- Housing 60 has at least one housing shell 64, which corresponds to the support section and which accommodates the functional components of the neck fan.
- All the functional components of the neck fan that require fastening are mounted on housing shell 64, and holding section 62 is free of such connections, allowing it to be used solely for mounting the housing shell and the neck fan at the location of use.

This makes it possible to produce a standard module including the housing shell, which can be easily and cost-effectively adapted to different locations of use by using holding sections that are suitable for the respective application.

According to an embodiment shown in FIG. 7, a neck fan preferably has a carrier 50 in a housing 60 having at least one of the following features:
- housing 60 has at least one support section 69 to which a carrier 50 is attached.
- Housing 60 has at least one cover 68, which corresponds to support section 69 and at least largely encloses the functional components of the neck fan.
- The housing has two helical housings or housing sections 65, each of which accommodates one impeller.
- Cover 68 includes a divider 66 for delimiting the working spaces of the two impellers from one another and for at least hampering the passage of air from one working space to the other.
- Cover 68 includes at least one air through opening, preferably at least two, preferably at least one intake opening 71 and at least one outlet opening 72.
- Support section 69 can be free of openings for air passage.
- Support section 69 is free of dividers, because the working spaces of the two impellers are delimited from one another by cover 68 and carrier 68.
- The carrier has two rounded sections 51, the shape of which at least partially follows the outer radius of the impellers concentrically.

If necessary, the separation of the working spaces can be further improved by seals between the carrier for the circuit board and the boundary 66 of cover 68. Thus, in this case, the blowers do not have a separate housing; rather, the housing of the neck fan functions as a blower housing and encloses the impeller of the blower. This is aimed at minimizing space requirements while providing high ventilation and temperature control output. It further serves to reduce costs, since savings on material and components such as blower housing, blower circuit board, and blower connection lines can be realized. The resulting neck fan is more robust and more compact. The noise level generated by the neck fan is decreased because temperature control devices, impellers, and flow paths are better matched.

The control device integrated into the common housing of the neck fan can communicates with the vehicle via a LIN bus. The control device can preferably monitor the functionality of at least one electrical component. In the event of a malfunction, it can shut off or restart the affected components temporarily or permanently.

The housing is preferably made entirely of polymeric material. The support section and its counterpiece are preferably connected solely via snap-in connections made of the same material as the housing, without adhesives, screws, or other sealing materials. The neck fan is also preferably assembled solely by means of snap-in connections of the neck fan.

At least one stator is preferably pressed into carrier 50.

The control device also handles the communication between the neck fan and the vehicle, the seat, and the respective control devices thereof.

The invention claimed is:

1. A neck fan for a vehicle seat comprising:
   at least one air conveying device for generating a usable air flow in a region of a headrest or an upper end of a seat back of the vehicle seat,
   at least one sensor to detect an interfering current acting on the usable air flow,
   one or more compensating means, by means of which asymmetrical climatic conditions caused by the interfering current in an area surrounding a passenger can be compensated for,
   wherein the one or more compensating means are configured to act asymmetrically on the usable air flow and/or impart an asymmetry to a cross-section of the usable air flow, at least in a region of an outlet of the neck fan, the asymmetry relating to at least one geometric or thermodynamic parameter.

2. The neck fan according to claim 1, wherein the outlet has a plurality of outlet openings arranged adjacent to one another, or the plurality of outlet openings are spaced from one another for cooperatively expelling the usable air flow from the neck fan toward the passenger from a first outlet opening to a first side of a neck of the passenger and from a second outlet opening to a second side of the neck of the passenger.

3. The neck fan according to claim 1, wherein in at least one operating mode, the neck fan is controlled in a way in which the asymmetry of the usable air flow relates to at least one parameter selected from:
   i) a distribution of a temperature profile over the outlet,
   ii) a distribution of a flow velocity over the outlet,
   iii) a distribution of pressure over the outlet,
   iv) a spread of an outflow angle over the outlet, and
   v) a degree of deviation of an outflow direction of a homogeneously directed flow of the usable air from a longitudinal direction of a vehicle.

4. The neck fan according to claim 3, wherein a magnitude of the at least one parameter increases at least partially along the outlet of the neck fan in a horizontal direction from a vehicle center axis of the vehicle toward a vehicle outer side, or is directed toward the vehicle outer side.

5. The neck fan according to claim 1, wherein a flow direction, a shape of a dispersion cone, a temperature, a velocity, and/or a pressure of the usable air flow is influenced to compensate for asymmetries in a neck region, and
   wherein at least one functional component is provided as the one or more compensating means, the at least one functional component selected from: a temperature control device, a heating device, a cooling device, the at least one air conveying device, and a flow guiding element.

6. The neck fan according to claim 5, wherein the at least one functional component is in redundant number, in two temperature control devices, two air conveying devices, and/or two flow guiding elements.

7. The neck fan according to claim 1, wherein the neck fan includes a control device, which in at least one operating mode influences the usable air flow, asymmetrically to a longitudinal axis of the usable air flow and/or a vehicle, based upon data acquired in the vehicle.

8. The neck fan according to claim 1, wherein the at least one air conveying device comprises:
   i) an aperture, the aperture having a cross-section that can be adjusted via a control device, to adjust a volume of a temperature-controlled usable air flow, and/or
   ii) a blower, which is mounted pivotably to adjust a direction of the usable airflow, and/or
   iii) a flow guiding element, an orientation of which can be adjusted to adjust the direction of the temperature-controlled usable air flow.

9. The neck fan according to claim 1, wherein the neck fan includes:
   i) at least two air conveying devices that can be controlled independently of one another in terms of conveying output, and/or
   ii) at least two heating devices that can be controlled independently of one another in terms of heating output;
   wherein at least one of the at least two air conveying devices is assigned to a subset of a plurality of heating devices, and/or at least one of the at least two heating devices is assigned to a subset of a plurality of air conveying devices, and
   wherein the subset may be a subset of one.

10. The neck fan according to claim 1, wherein the at least one sensor is selected from a flow sensor, a pressure sensor, and/or a temperature sensor.

11. The neck fan according to claim 1, wherein the at least one sensor comprises two or more NTC sensors.

12. The neck fan according to claim 11, wherein the two or more NTC sensors detect a surface temperature on a surface of an aperture.

13. The neck fan according to claim 1, wherein the at least one sensor comprises an infrared sensor.

14. The neck fan according to claim 13, wherein the infrared sensor is enabled to identify or detect skin temperature of the passenger.

15. A control method for controlling at least one usable air flow that emerges in a region of a headrest of a vehicle seat from an outlet of a neck fan, the control method comprising:
   detecting an interfering current acting on the at least one usable air flow,
   determining a nature and/or intensity of a compensation response for influencing the at least one usable air flow dependent upon nature and/or intensity of the interfering current,
   implementing the determined compensation response by generating the at least one usable air flow that emerges from the outlet of the neck fan, asymmetrically with respect to at least one thermodynamic parameter relative to a longitudinal axis of a vehicle and/or of the at least one usable air flow.

16. The control method according to claim 15, wherein the determined compensation response is selected from: an adjustment of a flow direction, an outflow angle, a velocity, a temperature, a pressure, and/or a distribution of at least one of parameter horizontally within the at least one usable air flow, and
   wherein the implementing of the determined compensation response takes place at least approximately in real time.

17. The control method according to claim 15, wherein the at least one usable air flow passes through an aperture, and a cross-section of the aperture is increased or decreased to adjust a pressure and/or a volume flow rate of the at least one usable air flow, and
   wherein at least one blower and at least one temperature control device cooperate to generate the at least one usable air flow,
   wherein the at least one temperature control device is or has a cooling device or a heating device,
   wherein the at least one blower is pivoted to adjust a flow direction, wherein an output of the at least one blower is controlled to adjust the at least one usable air flow,
and/or
wherein an output of the at least one temperature control device is controlled via the control device.

18. The control method according to claim 15, wherein the interfering current acting on the at least one usable air flow is detected by sensors.

19. The control method according to claim 15, wherein:
at least one first blower and at least one first heating device cooperate to generate a first partial usable air flow,
at least one second blower and at least one second heating device cooperate to generate a second partial usable air flow,
an output of the at least one first blower and an output of the at last one second blower are controlled independently of one another to implement the compensation response, and/or
the output of the at least one first heating device and an output of the at least one second heating device are controlled independently of one another to implement the compensation response.

20. The control method according to claim 15, wherein the interfering current is detected with one or more sensors selected from: a flow sensor, a pressure sensor, a temperature sensor, an infrared sensor, or a combination thereof.

* * * * *